Nov. 20, 1962 K. REINIGER 3,064,923
GAS TURBINE PROPULSION PLANT AND AN
AIRPLANE EQUIPPED THEREWITH
Filed April 30, 1959
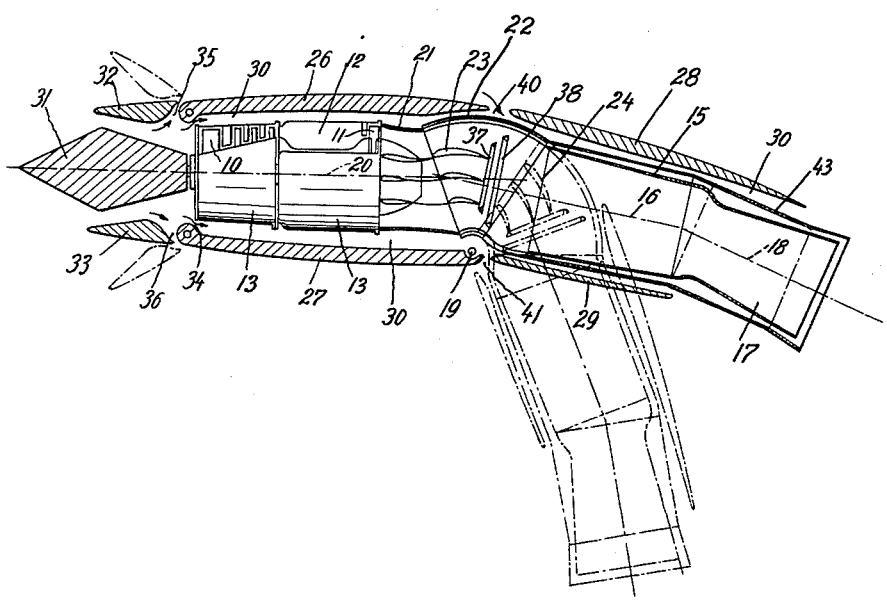
Inventor
KURT REINIGER
BY Dicke, Gray and Freudenberg
ATTORNEYS.

United States Patent Office 3,064,923
Patented Nov. 20, 1962

3,064,923
GAS TURBINE PROPULSION PLANT AND AN AIRPLANE EQUIPPED THEREWITH
Kurt Reiniger, Stuttgart-Zuffenhausen, Germany, assignor to Daimler-Benz Aktiengesellschaft, Stuttgart-Untertürkheim, Germany
Filed Apr. 30, 1959, Ser. No. 810,106
Claims priority, application Germany May 2, 1958
10 Claims. (Cl. 244—12)

My invention relates to a gas turbine propulsion plant and to an airplane equipped therewith and particularly adapted for starting vertically or after a short run. More especially, my invention relates to gas turbine propulsion plants of the type including an after-burner and a jet nozzle, in which the jet may be diverted for producing a reactionary force transversely to the longitudinal axis of the airplane.

It is the object of my invention to provide improved means for diverting the jet produced by the gas turbine propulsion plant, particularly for facilitating starting and landing maneuvers by the thrust or a component of the thrust acting in a direction opposite to the effect of gravity. More particularly, it is an object of the invention to provide a gas turbine propulsion plant including means for diverting the jet boosted by an after-burner.

Further objects of my invention will appear from the description following hereinafter of a preferred embodiment thereof with reference to the accompanying drawings. It is to be understood, however, that my invention is in no way limited to the details of such embodiment but is capable of numerous modifications within the scope of the appended claims and that the terms and phrases used in such detailed description have been chosen for the purpose of illustrating the invention rather than that of restricting or limiting same.

In the drawings there is shown a sectional view of a wing in which my improved gas turbine propulsion plant is installed, the section being taken along a vertical plane extending fore-and-aft of the airplane.

The gas turbine propulsion plant shown in the drawing comprises a rotary compressor 10, a turbine 11 connected with the rotary compressor to be supplied with the compressed air thereby and to drive the compressor 10, a plurality of circumferentially distributed combustion chambers 12 interposed between the compressor 10 and the turbine 11, and a common housing 13 for the compressor 10, the turbine 11 and the combustion chambers 12. These elements constitute a first unit of the plant.

Furthermore, the gas turbine propulsion plant comprises a second unit including an after-burner 15 having a longitudinal axis 16 and a jet nozzle 17 having a longitudinal axis 18. The two units of the plant are pivotally connected for angular relative adjustment about a pivotal axis 19 extending transversely to the axis 20 of rotation of the turbine 11. The units of the plant include gas conducting means establishing a permanent communication between the exhaust end of the turbine 11 and the intake end of the after-burner 15 irrespective of the relative angular adjustment of the units. In the embodiment shown, this gas conducting means comprises tubular members 21 and 22 which are connected to the adjacent ends of the units of the plant and have engaging portions curved about the pivotal axis 19. The tubular member 21 is mounted to receive the exhaust gases from the turbine 11 and to conduct them into the tubular member 22 which is mounted for supplying the exhaust gases to the after-burner 15. Preferably, the curve portion of one of the tubular members, such as the member 22, is formed by a double walled jacket. The curved portion of the other member extends into the space between the walls of the jacket. In order to minimize turbulation of the exhaust gases flowing from the turbine to the after-burner, two sets of curved vanes 23 and 24 are mounted in and connected to the curved engaging portions of the tubular members. These vanes are curved about the axis 19 and are disposed for interengagement upon relative pivotal adjustment of the units. In the drawing the second unit of the plant including the after-burner 15 and the jet nozzle 17 are shown in full lines in their normal position for ordinary flight and are shown in dash-dotted lines in the abnormal pivoted position for landing or starting maneuvers or for flight at extremely low speeds. It will be noted that when the second unit is in its normal position, the axis 16 includes an obtuse angle with the axis 20 of the turbine and is downwardly and rearwardly inclined. Moreover, it will be noted that the axis 18 of the jet nozzle includes an obtuse angle with the axis 16 of the after-burner and is likewise rearwardly and downwardly inclined.

In the drawing the gas turbine propulsion plant described hereinabove is shown as being installed in the wing of an airplane. This wing is composed of a main portion to which the first unit of the plant is rigidly connected and a flap portion to which the second unit of the plant is rigidly connected. The flap portion of the wing is thus pivotally connected to the main portion for angular adjustment about the axis 19.

Preferably, each of the wing portions comprises an upper wall section and a lower wall section rigidly connected therewith and spaced therefrom. Thus, the main portion of the wing is composed of an upper wall section 26 and of a lower wall section 27, whereas the flap portion of the wing is composed of an upper wall section 28 and a lower wall section 29. Each of the units of the plant is included in the space between the upper wall section and the lower wall section and is slightly spaced therefrom so as to form a channel 30 through which cooling air is supplied.

In front of the turbine 10 there is provided an air intake diffusor constructed for supersonic flight. This diffusor comprises a central air displacing member 31 formed by an elongated member shown in cross section in FIG. 1 and a pair of air scooping lips 32 and 33 which are hinged to the front edges of the wall sections 26 and 27 of the wing for pivotal adjustment between the position shown in full lines and the position shown in dash-dotted lines. For starting and landing maneuvers and for flight at low speeds the lips 32 and 33 are opened by adjustment to the dash-dotted position in order to minimize the resistance to the flow of air past the rounded off front surfaces of the upper wall section 26 and of the lower wall section 27. These front surfaces are designed to serve as a subsonic diffuser. For flight at supersonic speeds the lips are so adjusted as to take in the required quantities of air. In supersonic flight the air conducted between the lips 32, 33 and the air displacing member 31 is compressed by oblique shock waves and is slowed down to be supplied to the intake side of the compressor 10 with a subsonic speed. Part of this air flows through a gap 34 provided between the housing 13 of the compressor 10 and the inner faces of the front edges of the wing sections 26 and 27 to the channel 30. Gaps 35 and 36 are provided between the opposed edges of the wing sections 26 and 27 and the pivotal lips 32 and 33. A surplus of air taken in by the supersonic diffusor may escape through these gaps 35 and 36 outwardly in the direction of the arrows shown in the drawing.

When the flap portion of the wing and the second unit of the propulsion plant rigidly connected therewith have been adjusted to the abnormal position shown in dash-dotted lines, the main portion and the flap portion of the wing constitute a jet wing around which a supercirculation will develop for producing additional aero-dynamic uplift. Preferably, the axis 16 of the after-burner extends parallel to the wall section 28 of the flap wing portion.

The fuel nozzles producing the flames which heat the exhaust gases in the after-burner 15 may be carried either by a bracket 37 fixed to the vanes 23 or to a bracket 38 fixed to the tubular member 22. If desired, the nozzles may be mounted on the rear ends of the vanes 24. In this event, the fuel is supplied through the vanes which are cooled by the fuel.

The angular disposition of the axis 16 relative to the axes 18 and 20, when the second unit of the plant is in its normal position for ordinary flight, is an important feature of my invention. Preferably, the axes 18 and 20 include an angle of about 23°. When the airplane in a starting maneuver is held in a position in which the wing is so inclined as to have an angle of attack of 11°, this being the angle of inclination of the axis 20 of the turbine relative to the horizontal, an angular displacement of the second unit of the plant through 56° will be sufficient to direct the gas jet issuing from the nozzle 17 to substantially vertical direction.

Between the rear edges of the wall sections 26 and 27 of the main portion of the wing and the wall sections 28 and 29 of the flap portion of the wing gaps 40 and 41 are preferably provided. The gap 40 serves to suck off the boundary layer of air from the upper surface of the wing by the ejector effect of the jet. This air flows through the gap 30 rearwardly and will cool the peripheral surface of the after-burner 15 and the inner sides of the wall sections 28 and 29.

The space between the walls of the double-walled jacket formed by the curved portion of the tubular member 22 is so wide as to provide ample clearance for angular movement of the member 21. This clearance prevents interference that could be caused by heat expansion and preferably communicates with the channel 30 to permit the flow of cooling air therethrough under the suction effect produced by the jet. In order to enhance this suction effect, the after-burner 15 and the jet nozzle 17 are preferably provided with a surrounding jacket 43 flaring at its rear end, the space between this jacket 43 and the after-burner 15 communicating with the clearance above referred to.

My invention is readily applicable to airplanes of the type in which the gas turbine propulsion plant is not installed inside of the wing but is attached thereto otherwise.

The angular disposition of the axis 16 relative to the axes 18 and 20 is applicable with great advantage to airplanes in which the after-burner and the jet nozzle are fixed in their normal positions.

My invention has the additional advantage that owing to the rigid installation of the gas turbine and the compressor in the main portion of the wing I may likewise fixedly install such auxiliary apparatus that are driven by the gas turbine.

While in the embodiment shown the axis 19 is substantially horizontal, my invention is applicable with advantage to an arrangement in which the pivotal axis 19 is disposed other than horizontal in order to produce horizontal components of the thrust which may counteract centrifugal forces, for instance.

From the foregoing description it will appear that the pivotal connection between the two units of the propulsion plant which is in form of a hinge connecting the lower wall sections 27 and 29 of the wing is located in a zone in which the aero-dynamic and thermic conditions can be readily controlled. Moreover, it will appear that owing to the normal angular disposition of the axis 16 relative to the axes 18 and 20 an angular displacement through considerably less than 90° is sufficient to direct the jet vertically in downward direction. This effect may be enhanced by so constructing the landing gear that in starting maneuvers the wing of the airplane will be held at a large angle of attack.

While the inclination of the axis 18 of the jet nozzle in ordinary flight slightly reduces the horizontal component of the thrust produced by the jet, this inclination has the advantage of producing a considerable vertical component of the thrust which increases the uplift. This is particularly desirable for flights at high altitudes where the induced air resistance is particularly high. As this resistance depends on the uplift, it may be considerably reduced by a reduction of the aero-dynamic uplift rendered possible by the vertical thrust component. As a result, my novel airplane is capable of flight in higher altitudes than those which could be reached with a coaxial disposition of the turbine and the jet nozzle. Moreover, the angular disposition of the jet nozzle relative to the turbine permits the airplane to flow at extremely low speeds in horizontal direction as a considerable portion of the weight of the plane is supported by the vertical component of the jet, particularly when the wing is held at a large angle of attack. Where the angle of attack plus the angle included between the axes 18 and 20 exceeds 30°, the vertical component of the jet thrust will carry more than half the weight of the airplane. Hence, the airplane may be flown at a very low minimum speed with the after-burner and the jet nozzle in normal position.

From the foregoing it will be seen that this invention is one well adapted to attain all of the ends and objects hereinabove set forth, together with other advantages which are obvious and which are inherent to the plant.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A primary gas turbine propulsion plant comprising a rotary compressor, a turbine connected with said compressor to be supplied with compressed air thereby and to drive said compressor, combustion chambers interposed between said compressor and said turbine, and a common housing for said compressor, said turbine and said combustion chambers, an after-burner connected with said turbine to receive the exhaust gases therefrom for heating same, and a jet nozzle connected with said after-burner to receive and discharge the heated exhaust gases, said compressor forming the front end and said jet nozzle forming the rear end of said propulsion plant, the longitudinal axis of said after-burner forming an obtuse angle with the axis of rotation of said turbine and being rearwardly and downwardly inclined relative thereto in the normal position of these members for horizontal flight, and the longitudinal axis of said jet nozzle forming an obtuse angle with the longitudinal axis of the after-burner and being rearwardly and downwardly inclined relative thereto.

2. The combination claimed in claim 1, further comprising means for pivotally mounting said after-burner for a maximum angular adjustment of about 55°.

3. In an airplane, a wing composed of a main portion and of a flap portion pivotally connected to the main portion for angular adjustment about an axis extending lengthwise of the wing, and a primary gas turbine propulsion plant comprising a first unit including a compressor and a turbine and a second unit including an after-burner and a jet nozzle, said first unit being rigidly connected with said main portion of said wing and said second unit being rigidly connected with said flap portion of said wing, said units including gas-conducting means establishing a permanent communication between the exhaust end of said turbine and the intake end of said after-burner irrespective of the relative angular adjustment of said units.

4. An airplane as claimed in claim 3 in which said units are constructed for a maximum relative angular displacement of 90°−α from a normal position for ordinary flight to an abnormal position for starting maneuvers, in which α is the sum of the angle of attack of said wing during a starting maneuver plus the angle which the longitudinal axis of said jet nozzle forms with the longitudinal axis of said turbine, when said units are in said normal position.

5. An airplane as claimed in claim 4 in which the longitudinal axis of said after-burner extends substantially parallel to said flap portion of said wing.

6. An airplane as claimed in claim 3 in which each of said wing portions comprises an upper wall section and a lower wall section rigidly connected therewith and spaced therefrom, each of said units being included in the space between said wall sections and being slightly spaced therefrom, a gap being provided between said upper wall sections of said wing portions for sucking off the boundary layer of air from the upper surface of said wing.

7. In an airplane as claimed in claim 3, further comprising means associated with the main portion of the wing defining a subsonic diffuser, and means spaced forwardly of said subsonic diffuser defining a supersonic diffuser.

8. An airplane as claimed in claim 7, in which said means defining a supersonic diffuser include air-scooping lips, and a central air-displacing member.

9. An airplane as claimed in claim 3, wherein said gas-conducting means include at least one double-walled member having a space between the walls, and means telescoping into said space between the walls.

10. An airplane as claimed in claim 3, wherein said first and second units are nearly the same size, and the axes of said units lie in substantially the same vertical plane.

References Cited in the file of this patent

UNITED STATES PATENTS

| | | |
|---|---|---|
| 2,857,740 | Hall et al. | Oct. 28, 1958 |
| 2,885,162 | Griswold | May 5, 1959 |
| 2,912,188 | Singelmann et al. | Nov. 10, 1959 |
| 2,986,877 | Emmons | June 6, 1961 |

FOREIGN PATENTS

| | | |
|---|---|---|
| 308,179 | Switzerland | June 30, 1955 |